Patented Apr. 25, 1950

2,505,462

UNITED STATES PATENT OFFICE 2,505,462

ALKAMINE SULFIDES OF QUINOLINE AND METHOD OF PRODUCING THE SAME

Raymond O. Clinton and Chester Merle Suter, Albany, N. Y., assignors to Sterling Drug Inc., Wilmington, Del., a corporation of Delaware No Drawing. Application August 8, 1947, Serial No. 767,650

16 Claims. (Cl. 260—288)

This invention relates to alkamine sulfides of quinoline and to a process of preparing such sulfides. More specifically, said sulfides are 2- or 4-(substituted-aminoalkylmercapto) quinolines.

We have found that compounds having the general formula, Q—S—R—B, wherein Q is a quinoline nucleus attached to S at one of the positions two and four, R is a lower alkylene radical, and B is an aliphatically-bound amino group, possess valuable pharmaceutical properties, especially as antibacterial agents. The quinoline nucleus may be further substituted by such groups as lower alkyl, including methyl, ethyl, etc. and halogen, such as chloro, bromo, iodo, and fluoro, as well as by other groups inert to mild alkali, such as alkoxy, nitro, and so on. Examples of such quinolyl groups include: 7-chloro-4-quinolyl, 2-quinolyl, 4-methyl-2-quinolyl, 3-methyl-7-chloro-4-quinolyl, 3,8-dimethyl-4-quinolyl, 6-methoxy-4-quinolyl, 8-nitro-4-quinolyl, 5,8-dichloro-4-quinolyl, 6,8-dibromo-4-quinolyl, 5,6-dichloro-4-quinolyl, 3-iodo-5-chloro-4-quinolyl, 3-bromo-7-chloro-4-quinolyl, 5,7-dibromo-4-quinolyl, 5-bromo-8-chloro-4-quinolyl, 6-bromo-8-iodo-4-quinolyl, and the like. In the above general formula, R is preferably a lower alkylene radical having from 2 to 5 carbon atoms, and B is preferably an aliphatic-secondary- or -tertiary-amino group. Examples of B—R— include: 2-diethylaminoethyl, 3-diethylaminopropyl, 3-N-piperidylpropyl, 2-(2-methyl-N-piperidyl)ethyl, 2-N-morpholinylethyl, 4-dimethylaminobutyl, 5-diethylamino-2-pentyl, 2-di-n-butylaminoethyl, 5-(2-propylamino)pentyl, 3-(n-butylamino)-propyl, and the like.

The compounds of our invention are prepared by reaction between an (aliphatically-substituted-amino)alkanethiol and a 2- or 4-chloroquinoline in the presence of an acid-binding agent. The thiols used as intermediates can be prepared by methods which have been previously described (Albertson and Clinton, J. Am. Chem. Soc. 67, 1222 (1945); Clinton and Salvador, ibid. 68, 2076 (1946); Laskowski and Clinton, ibid, 69, 519 (1947)).

The basic sulfides of our invention have the same therapeutic actions, whether employed as the free bases, which provide the active component, or—and often more conveniently—as their salts with non-toxic inorganic or organic acids; so it will be understood that the free bases and their salts are equivalents with respect to the instant invention. Among the acids which may be employed to form the salts are hydrochloric, phosphoric, sulfuric, sulfamic, tartaric, citric, benzoic, and the like.

Further, it is to be understood that, while the invention is described in the following examples with particular reference to specific embodiments, it is not limited thereto, but is rather defined by the appended claims.

Example 1

7-chloro-4-(2-diethylaminoethylmercapto) quinoline.—To a warm solution of 1.75 g. of sodium in 50 ml. of absolute alcohol, contained in a 250 ml. three-neck flask equipped with a reflux condenser, mechanical stirrer and dropping funnel, 10.1 g. of 2-diethylaminoethanethiol are added in one portion. The solution is heated under reflux with stirring and there is added drop-wise over a period of twenty minutes a solution of 15.0 g. of 4,7-dichloroquinoline in 100 ml. of absolute alcohol. There is an almost immediate precipitation of sodium chloride. The mixture is refluxed and stirred for an additional four hours and then filtered. After removal of the alcohol in vacuo, the residual orange-colored oil is distilled in vacuo, the desired fraction boiling at 140-9° C. at 0.06 mm. Several crystallizations of the distillate from petroleum ether (B. P. 28–38° C.) at —40° C. gives pale yellow prisms of 7-chloro-4-(2-diethylaminoethylmercapto)quinoline, M. P. 15–6° C.

7-chloro-4-(2-diethylaminoethylmercapto) quinoline diphosphate. which is prepared by mixing a methanolic solution of the base with an equimolecular amount of 85% phosphoric acid, crystallizes from ethanol in rosettes of small white prisms, M. P. 153.5–7.5° C.

Example 2

4-(2-diethylaminoethylmercapto)-3,8-dimethylquinoline.—The reaction between the sodium salt of 2-diethylaminoethanethiol and 4-chloro-3,8-dimethylquinoline is carried out as described above in Example 1. The crude product, after removal of the alcohol in vacuo, is dissolved in 5% hydrochloric acid and the solution made neutral to Congo red by the addition of sodium acetate. The mixture is extracted thoroughly with ether to remove any unreacted chloroquinoline, the aqueous layer made strongly basic with 35% sodium hydroxide solution, and the precipitated oil extracted into ether. After the ethereal extract has been dried, the ether is removed in vacuo to yield an oil, which is difficult to purify by distillation because of its tendency to decompose on strong heating. However, the base is readily purified through its picrate, as follows. The oily base is dissolved in alcohol and the solution is treated with somewhat more than two equivalents of picric acid in alcoholic solution. The resulting dipicrate of 4-(2-diethylaminoethylmercapto) - 3,8 - dimethylquinoline crystallizes from glacial acetic acid-alcohol solution in long feathery canary-yellow needles, M. P. 177–9° C. The dipicrate is shaken well with a mixture of ethyl acetate and dilute (about 5–15%) aqueous hydrochloric acid solution. The acidic layer is separated and treated with ammonium hydroxide to liberate the basic quinoline, which is taken up in an appropriate solvent, such as ethyl acetate, ether, etc. Removal of the solvent in vacuo yields the base which is treated in acetone solution with an excess of ethereal anhydrous hydrogen chloride (15% by weight). Crystallization from absolute alcohol-ethyl acetate-ether gives short, pale yellow needles of 4-(2-diethylaminoethylmercapto)-3,8-dimethylquinoline dihydrochloride, M. P. 188–90° C.

*Example 3*

2-(3 - diethylaminopropylmercapto)-4-methylquinoline.—This preparation is carried out as in Example 1 but using 2.3 g. of sodium in 75 ml. of absolute alcohol, 14.7 g. of 3-diethylaminopropanethiol, and 17.8 g. of 2-chloro-4-methylquinoline in 100 ml. of absolute alcohol. The reaction mixture is refluxed for nine hours. After removal of the alcohol by distillation in vacuo, the residual oil is distilled in vacuo, collecting the fraction boiling at 135–60° C. at 0.35 mm. Redistillation of this fraction at 169° C. at 0.4 mm. yields, as a yellow oil, 2-(3-diethylaminopropylmercapto)-4-methylquinoline.

The dihydrochloride is prepared by dissolving 10 g. of the above base in 75 ml. of acetone and adding thereto an excess of ethereal anhydrous hydrogen chloride (15%). The yellow oil which results is triturated to yield a solid, which, when filtered, recrystalized once from absolute alcohol-acetone and then once from isopropanol, and dried at 65° C., melts at 198–201° C. (with decomposition).

Other substituted - aminoalkylmercaptoquinolines which can be prepared according to the directions given in Examples 1, 2 or 3 are given in Table I. Salts of these bases are given in Table II.

*Table I*

| No. | Compound | B. p. | Pressure |
|---|---|---|---|
| | | °C. | Mm. |
| 1 | 2-(2-Diethylaminoethylmercapto)quinoline | 113 | 0.05 |
| 2 | 2-(3-Diethylaminopropylmercapto)-4-methylquinoline | 169 | 0.40 |
| 3 | 4-(2-Diethylaminoethylmercapto)-3,6-dimethylquinoline | 150 | 0.34 |
| 4 | 7-Chloro-4-(3-diethylaminopropylmercapto)-quinoline [1] | 140 | 0.04 |
| 5 | 7-Chloro-4-(3-N-piperidylpropylmercapto)-quinoline [2] | 152 | 0.03 |
| 6 | 7-Chloro-4-(4-Diethylaminobutylmercapto)-quinoline | 146 | 0.02 |
| 7 | 7-Chloro-4-(5-diethylamino-2-pentylmercapto)-quinoline | 182 | 0.45 |
| 8 | 7-Chloro-4-(3-diethylaminopropylmercapto)-3-methylquinoline | 176 | 0.47 |
| 9 | 7-Chloro-4-(5-(2-propylamino)pentylmercapto)-quinoline [3][4] | | |

[1] M. P. 20–1° C. (from petroleum ether).
[2] M. P. 46–8° C. (from petroleum ether).
[3] M. P. 39° C. (from petroleum ether).
[4] The intermediate, 5-(2-propylamino)pentanethiol, which is prepared from 5-(2-propylaminopentyl) chloride (see J. Am. Chem. Soc. 67, 1222 (1945) for general method of preparation), is a colorless oil, B. P. 94° C. at 8 mm.

The various salts corresponding to the bases given in Table I are presented below in Table II.

*Table II*

[Salts, M. P. (° C.)]

| No. | Picrate | Hydrochloride | Phosphate |
|---|---|---|---|
| 1 | 148–50 | | 106.5–7.5 |
| 2 | 130–1 | [1] 198–201 | |
| 3 | 164–5 | 210–2.5 | |
| 4 | 215–6 | 175–8 | |
| 5 | [1] 238–40 | | [1] 227–8 |
| 6 | [1] 195–6 | | |
| 7 | 175–6 | | |
| 8 | [1] 196–7 | [1] 193–6 | |
| 9 | 185–6 | 225 | |

[1] With decomposition.

In addition, the following compounds result when the above directions are followed but using the appropriate 2- or 4-chloroquinolines and (aliphatically-substituted)-aminoalkylamine: 4-(4-dimethylaminobutylmercapto)-5,8 - dichloroquinoline, 4-(2-(2-methyl-N-piperidyl)ethylmercapto)-6,8-dibromoquinoline, 4-(2-di - n - butylaminoethylmercapto) - 5 - bromo - 8 - iodoquinoline, 4-(3-n-butylaminopropylmercapto)-3-iodo-5-chloroquinoline, 4-(2-N-morpholinylethylmercapto)-3-bromo-7-chloroquinoline, 4-(3-diethylaminopropylmercapto)-5,7-dibromoquinoline, 6-methoxy - 2 - (3-diethylaminopropylmercapto)-quinoline, 7-chloro-2-(2-N-piperidylethyl - mercapto)quinoline, 4-methyl-2-(2-n - propylaminoethylmercapto)quinoline, and the like.

We claim:

1. A compound from the group consisting of those having the formula Q—S—R—B in which Q is a quinoline nucleus attached to S at one of the positions 2 and 4, R is a lower alkylene radical having 2–5 carbon atoms, and B is a member of the group consisting of alkylamino, dialkylamino, morpholinyl, piperidyl and alkylpiperidyl radicals wherein the group B is attached to R through the nitrogen atom thereof and acid addition salts thereof.

2. A compound from the group consisting of those having the general formula,

Q—S—R—NH—alkyl wherein Q is a quinoline nucleus attached to S at the 4-position and R is a lower alkylene radical having 2–5 carbon atoms and acid addition salts thereof.

3. A compound from the group consisting of those having the general formula,

Q—S—R—N(alkyl)$_2$ wherein Q is a quinoline nucleus attached to S at the 4-position and R is a lower alkylene radical having 2–5 carbon atoms and acid addition salts thereof.

4. A compound from the group consisting of those having the general formula,

Q—S—R—NC$_5$H$_{10}$ wherein Q is a quinoline nucleus attached to S at the 4-position, R is a lower alkylene radical having 2–5 carbon atoms and NC$_5$H$_{10}$ is an N-piperidyl radical and acid addition salts thereof.

5. A compound from the group consisting of 7 - chloro - 4 -(2 - diethylaminoethylmercapto)-quinoline and acid addition salts thereof.

6. A compound from the group consisting of 7 - chloro - 4 - (3 - N - piperidylpropylmercapto)-quinoline and acid addition salts thereof.

7. A compound from the group consisting of 7 - chloro - 4 - (5 - (2 - propylamino)pentylmercapto)quinoline and acid addition salts thereof.

8. A compound from the group consisting of 7-chloro-4-(5-diethylamino-2-pentylmercapto)quinoline and acid addition salts thereof.

9. A compound from the group consisting of 7-chloro-4-(4-diethylaminobutylmercapto)quinoline and acid addition salts thereof.

10. A method of preparing a quinolyl alkamine sulfide having the general formula, Q—S—R—B, wherein Q is a quinoline nucleus attached to S at one of the positions two and four, R is a lower alkylene radical having 2-5 carbon atoms, and B is a member of the group consisting of alkylamino, dialkylamino, morpholinyl, piperidyl and alkylpiperidyl radicals wherein the group B is attached to R through the nitrogen atom thereof, which comprises reacting a chloroquinoline wherein the chlorine atom is at one of the positions two and four with an alkali metal salt of a basic thiol of the formula, B—R—SH, wherein B and R have the meanings already given.

11. A method of preparing a quinolyl alkamine sulfide having the general formula, Q—S—R—N(Alkyl)$_2$ wherein Q is a quinoline nucleus attached to S at one of the positions two and four and R is a lower alkylene radical having 2-5 carbon atoms, which comprises reacting a chloroquinoline wherein the chlorine atom is at one of the positions two and four with an alkali metal salt of a dialkylaminoalkanethiol of the formula, (Alkyl)$_2$N—R—SH wherein R is a lower alkylene radical.

12. A method of preparing 7-chloro-4-(5-diethylamino-2-pentylmercapto)quinoline which comprises reacting 4,7-dichloroquinoline with the sodium salt of 5-diethylamino-2-pentanethiol.

13. A method of preparing 7-chloro-4-(4-diethylaminobutylmercapto)quinoline which comprises reacting 4,7-dichloroquinoline with the sodium salt of 4-diethylaminobutanethiol.

14. A method of preparing 7-chloro-4-(2-diethylaminoethylmercapto)quinoline which comprises reacting 4,7-dichloroquinoline with the sodium salt of 2-diethylaminoethanethiol.

15. A method of preparing 7-chloro-4-(3-N-piperidylpropylmercapto)quinoline which comprises reacting 4,7-dichloroquinoline with the sodium salt of 3-N-piperidylpropanethiol.

16. A method of preparing 7-chloro-4-(5-(2-propylamino)pentylmercapto)quinoline which comprises reacting 4,7-dichloroquinoline with the sodium salt of 5-(2-propylamino)pentanethiol.

RAYMOND O. CLINTON.
CHESTER MERLE SUTER.

REFERENCES CITED

The following references are of record in the file of this patent:

UNITED STATES PATENTS

| Number | Name | Date |
|---|---|---|
| 1,572,768 | Callsen | Feb. 9, 1926 |
| 1,860,286 | Hartmann et al. | May 24, 1932 |
| 2,189,717 | Scott | Feb. 6, 1940 |

FOREIGN PATENTS

| Number | Country | Date |
|---|---|---|
| 363,690 | Great Britain | Feb. 5, 1932 |

OTHER REFERENCES

Wiselogle: "Survey of Antimalarial Drugs, 1941-1945" (J. W. Edwards, Ann Arbor, Mich., 1946), pages 1107 and 1108.

Karrer: "Organic Chemistry" (Nordemann Publishing Co., New York, 1938), pp. 103 and 107-109.

Massie: Iowa State College J. Sci., vol 21, pp. 41-45 (1946).